(12) United States Patent
Koga (10) Patent No.: US 8,348,326 B2
(45) Date of Patent: Jan. 8, 2013

(54) SEAT SLIDE APPARATUS FOR VEHICLE

(75) Inventor: Yoshitaka Koga, Chiryu (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 283 days.

(21) Appl. No.: 12/837,977

(22) Filed: Jul. 16, 2010

(65) Prior Publication Data

US 2011/0031774 A1 Feb. 10, 2011

(30) Foreign Application Priority Data

Aug. 4, 2009 (JP) ................................. 2009-181238

(51) Int. Cl.
*B60N 2/07* (2006.01)
(52) U.S. Cl. .................. 296/65.15; 296/96.13
(58) Field of Classification Search .... 296/65.13–65.15; 297/344.1, 344.11, 344.14; 248/429, 430
See application file for complete search history.

(56) References Cited

U.S. PATENT DOCUMENTS

| | | | |
|---|---|---|---|
| 4,614,257 A | 9/1986 | Harada et al. | |
| 5,224,749 A * | 7/1993 | Gauger et al. | 296/65.13 |
| 6,688,667 B2 * | 2/2004 | Nishimoto et al. | 296/65.15 |
| 7,350,844 B2 * | 4/2008 | Nemoto | 296/65.16 |
| 7,658,429 B2 * | 2/2010 | Koga et al. | 296/65.15 |
| 8,128,051 B2 * | 3/2012 | Koga et al. | 248/429 |
| 2007/0063566 A1* | 3/2007 | Browne et al. | 297/344.11 |
| 2011/0031774 A1* | 2/2011 | Koga | 296/65.15 |

FOREIGN PATENT DOCUMENTS

JP 59-117922 7/1984

* cited by examiner

*Primary Examiner* — Glenn Dayoan
*Assistant Examiner* — Gregory Blankenship
(74) *Attorney, Agent, or Firm* — Oblon, Spivak, McClelland, Maier & Neustadt, L.L.P.

(57) ABSTRACT

A seat slide apparatus for a vehicle includes: a plurality of lower rails adapted to be fixed at a floor of the vehicle in an inclining manner relative to the floor of the vehicle; a plurality of upper rails adapted to be slidably supported by the lower rails, respectively, and to support a seat for the vehicle; a motor generating a driving force for moving the upper rails in a manner where the upper rails slide relative to the corresponding lower rails; a transmitting mechanism transmitting the driving force of the motor to the upper rails; and at least one slide-resistance applying portion provided in the transmitting mechanism and applying an increased slide resistance to the transmitting mechanism when the upper rails move to slide downwardly on the inclination while applying a decreased slide resistance to the transmitting mechanism when the upper rails move to slide upwardly on the inclination.

20 Claims, 7 Drawing Sheets

SEAT SLIDE APPARATUS FOR VEHICLE

CROSS REFERENCE TO RELATED APPLICATIONS

This application is based on and claims priority under 35 U.S.C. §119 to Japanese Patent Application 2009-181238, filed on Aug. 4, 2009, the entire content of which is incorporated herein by reference.

TECHNICAL FIELD

This disclosure relates to a seat slide apparatus for a vehicle for moving a seat for the vehicle by means of a motor in a front-rear direction of the vehicle.

BACKGROUND DISCUSSION

Generally, a seat lifter apparatus for a vehicle for moving a seat for the vehicle (a driven-side member) in an upper-lower direction of the vehicle by rotating a motor (a driving-side member) includes a brake device in order to restrict a reverse rotation of the motor at the time when an excessive load is applied on the seat for the vehicle. For example, JPS59-117922A discloses a coupler device, serving as the brake device, in which a characteristic of a coil spring is utilized. More specifically, the coupler device includes a driving member, a driven member, a small-diameter coil spring and a large-diameter coil spring, which are accommodated within a case. When the driving member is rotated, a diameter of the small-diameter coil spring is expanded and the small-diameter coil spring is spaced away from an inner wall of the case while a diameter of the large-diameter coil spring is reduced and the large-diameter coil sprig is spaced away from an outer wall of the case. Therefore, a slide resistance is not generated between the case and each of the small-diameter and large-diameter coil springs, and the driven member is rotated in accordance with the rotation of the driving member. On the other hand, when the driven member is rotated, one of the small-diameter and large-diameter coil springs contacts one of the inner and outer walls of the case. Therefore, a slide resistance is generated between the case and one of the small-diameter and large-diameter coil springs, and the driving member is not rotated in accordance with the rotation of the driven member. Accordingly, even when a large load is applied on the seat for the vehicle, a reverse rotation of the motor is restricted and the motor is maintained to be in a state where a braking force is applied.

Further, generally, rails of a seat slide apparatus for a vehicle for moving a seat for the vehicle in a front-rear direction of the vehicle is fixed to a floor of the vehicle in an inclined manner so that front portions of the rails are arranged to be higher than rear portions thereof. The seat for the vehicle is moved toward a front side of the vehicle when a physically relatively small occupant, such as a child and the like, is seated thereon. Therefore, the rails are arranged in the above-mentioned inclining manner in order to raise eyes' position of the occupant and to ensure a sufficient filed of view. However, according the seat slide apparatus for the vehicle for moving the seat for the vehicle in the front-rear direction of the vehicle by means of a motor, the moving speed of the seat for the vehicle may be reduced when the seat for the vehicle is moving forward, while the moving speed of the seat for the vehicle may be increased when the seat for the vehicle is moving rearward, due to the inclination of the rails, depending on a weight of the occupant. The moving speed of the seat for the vehicle may be increased in an accelerated manner when the seat for the vehicle is moving rearward so as to move downward on the inclination, compared to when the seat for the vehicle is moving forward so as to move up on the inclination, thereby accelerating the rotation of the motor.

An increase of a rotational speed of the motor may cause an increase of an operational noise of the motor, frictional noise of the gear shafts and the like, vibration of engaged gears and the like. Generally, an operational noise becomes larger when the seat for the vehicle is moving rearward than when the seat for the vehicle is moving forward, thereby causing to generate a difference of noise. Accordingly, a difference of an operational characteristic is generated between the forward and rearward movements of the seat for the vehicle. In a case where the conventional coupler device of JPS59-117922A is applied to the seat slide apparatus for the vehicle, the coupler device may function as the brake device for restricting the reverse rotation of the motor by applying a braking force to the motor when an excessive load is applied on the seat for the vehicle. However, the difference of the moving speed between the forward and rearward movements of the seat for the vehicle may not be removed and the difference of the operational noise between the forward and rearward movements of the seat for the vehicle may not be reduced. Accordingly, the difference of the operational characteristic between the forward and rearward movements of the seat for the vehicle may remain.

A need thus exists for a seat slide apparatus for a vehicle, which is not susceptible to the drawback mentioned above.

SUMMARY

According to an aspect of this disclosure, a seat slide apparatus for a vehicle includes: a plurality of lower rails adapted to be fixed at a floor of the vehicle in an inclining manner in a longitudinal direction of the lower rails relative to a horizontal surface of the floor of the vehicle; a plurality of upper rails adapted to be slidably supported by the lower rails, respectively, and to support a seat for the vehicle; a motor generating a driving force for moving the upper rails in a manner where the upper rails slide relative to the corresponding lower rails; a transmitting mechanism transmitting the driving force of the motor to the upper rails; and at least one slide-resistance applying portion provided in the transmitting mechanism and applying an increased slide resistance to the transmitting mechanism when the upper rails move to slide downwardly on the inclination while applying a decreased slide resistance to the transmitting mechanism when the upper rails move to slide upwardly on the inclination.

According to another aspect of this disclosure, a seat slide apparatus for a vehicle includes: a plurality of lower rails adapted to be fixed at a floor of the vehicle; a plurality of upper rails adapted to be slidably supported by the lower rails and to support a seat for the vehicle; a motor generating a driving force for moving the upper rails in a manner where the upper rails slide relative to the corresponding lower rails; a transmitting mechanism transmitting the driving force of the motor to the upper rails; and a slide-resistance applying portion provided in the transmitting mechanism and applying an increased slide resistance to the transmitting mechanism when the upper rails move in a first direction and applying a decreased slide resistance to the transmitting mechanism when the upper rails move in a second direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

[First Embodiment]
A first embodiment of a seat slide apparatus 1 for a vehicle will be described hereinafter with reference FIGS. 1 to 5. According to the first embodiment, the seat slide apparatus 1 for the vehicle is applied on a front seat of the vehicle. Directions, such as "front", "rear", "left", "right" ("width"), "upper", "lower" and the like, which are used in the following description, correspond to front, rear, left, right (width), upper, lower and the like of the vehicle, respectively.

Figure 1:
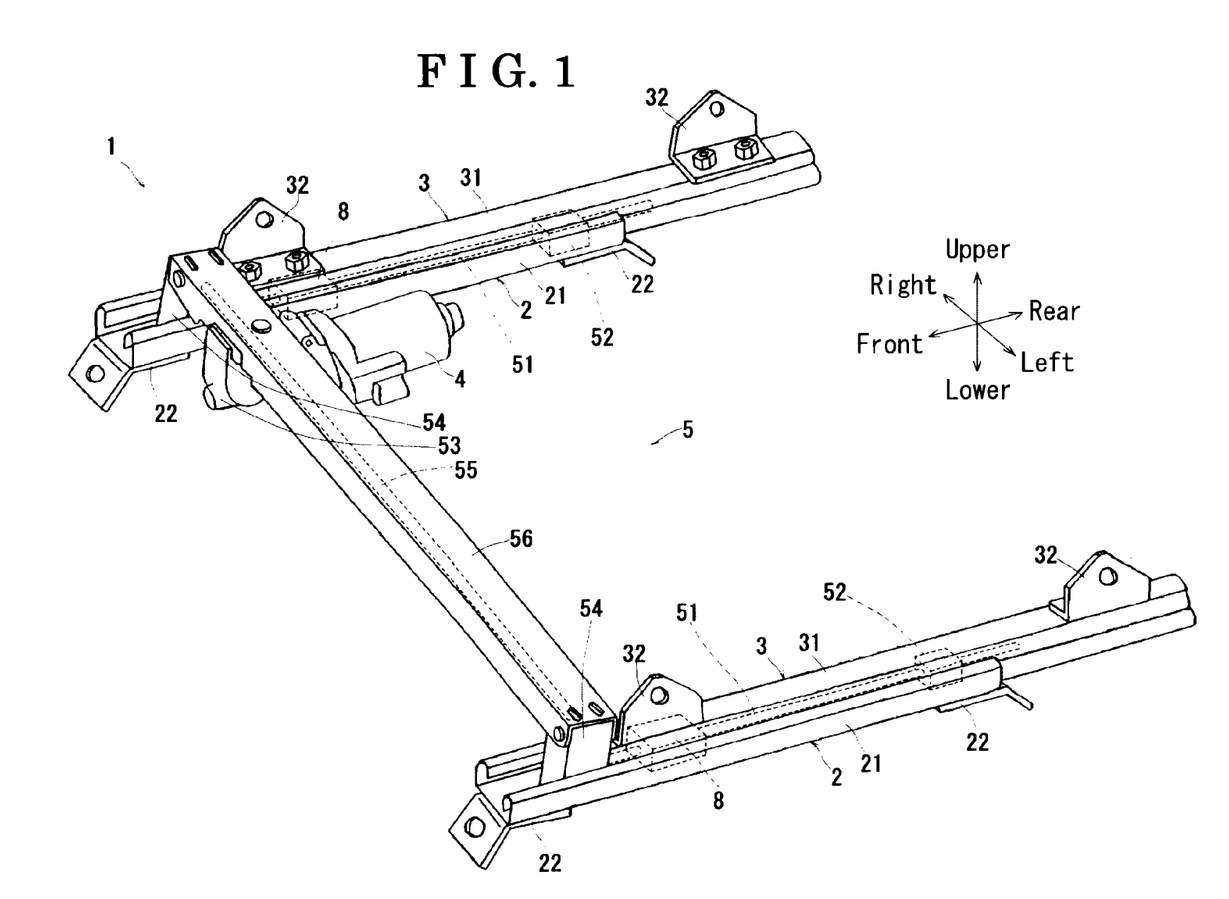
FIG. 1 is a perspective view illustrating a seat slide apparatus for a vehicle according to a first embodiment.
Figure 2:
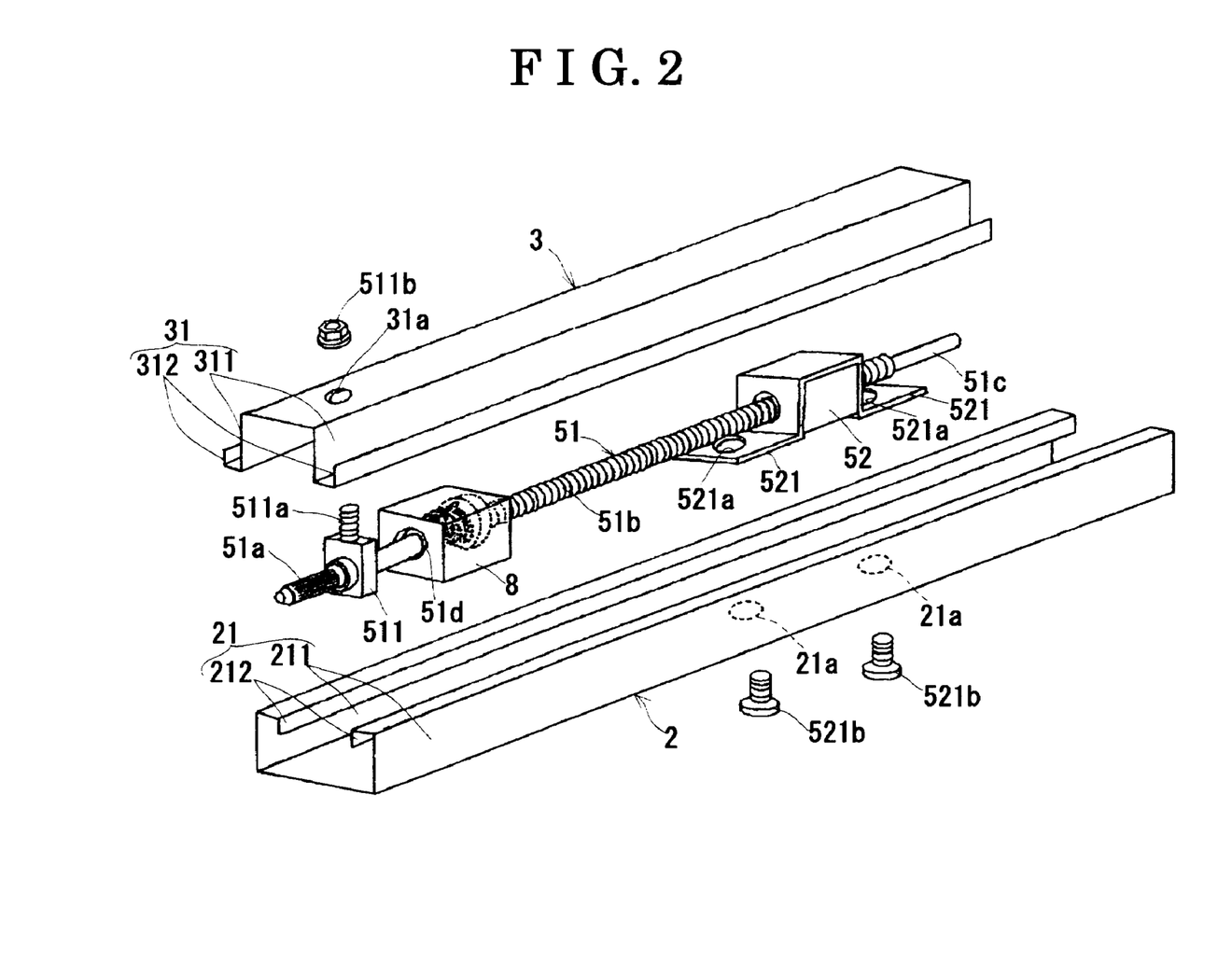
FIG. 2 is an exploded perspective view illustrating rails of the seat slide apparatus for the vehicle shown in FIG. 1.

As illustrated in FIG. 1, the seat slide apparatus 1 for the vehicle includes a pair of lower rails (a right lower rail and a left lower rail) 2, a pair of upper rails (a right upper rail and a left upper rail) 3, a motor 4, a transmitting mechanism 5, and a pair of slide-resistance applying devices (a right slide-resistance applying device and a left slide-resistance applying device) (a slide resistance applying portion) 8. The left and right lower rails 2 include substantially the same structure and function relative to each other. Therefore, only one of the left and right lower rails 2 will be described hereinafter as an example. Similarly, the left and right upper rails 3 include substantially the same structure and function relative to each other. Therefore, only one of the left and right upper rails 3 will be described hereinafter as an example. Further, the left and right slide-resistance applying devices 8 include substantially the same structure and function relative to each other. Therefore, only one of the left and right slide-resistance applying devices 8 will be described hereinafter as an example. As illustrated in FIGS. 1 and 2, the lower rail 2 includes a lower rail body portion 21 and floor-fixed portions 22. The lower rail body portion 21 is formed into a substantially longitudinal shape, extending in the front-rear direction. The lower rail body portion 21 is formed to include a substantially U-shaped cross-section, having left and right first side walls 211 and left and right first flange portions 212, which are respectively connected to and inwardly bent from upper ends of the left and right first side walls 211. The floor-fixed portions 22 are attached to a lower portion of the lower rail body portion 21 at front and rear end portions thereof, respectively, by means of rivets. The floor-fixed portion 22, attached to the front end portion of the lower rail body portion 21, is formed to be higher than the floor-fixed portion 22, attached to the rear end portion of the lower rail body portion 21. Therefore, the lower rail 2 is fixed to a floor of the vehicle via the floor-fixed portions 22 so as to include an inclination, which extends downwardly from the front toward the rear direction of the vehicle.

As illustrated in FIGS. 1 and 2, the upper rail 3 includes an upper rail body portion 31, seat-fixed portions 32, and a bracket-fixed portion. The upper rail body portion 31 is formed into a substantially longitudinal shape, extending in the front-rear direction. The upper rail body portion 31 is formed to include a substantially U-shaped cross-section, having left and right second side walls 311 and left and right second flange portions 312, which are respectively connected to and outwardly bent from lower portions of the left and right second side walls 311. When seen in a cross-section of the upper rail 3, taken in an orthogonal direction to the longitudinal direction of the upper rail body portion 31, the second flange portions 312 are arranged so as to be engageable with the first side walls 211 and the first flange portions 212 of the lower rail body portion 21, within a spaced portion defined thereby. The upper rail body portion 31 and the lower rail body portion 21 are engaged with each other at the second and first flange portions 312 and 212 via balls, so as to be relatively slidable in the longitudinal direction thereof.

In other words, the first flange portions 212 of the lower rail body portion 21 and the second flange portions 312 of the upper rail body portion 31 are engaged with each other so that a relative movement in an upper-lower direction is restricted, and a relative movement in the front-rear direction is allowed via the balls. Therefore, the upper rail body portion 31 is arranged so as to be slidable in the front-rear direction within the lower rail body portion 21. When the upper rail body portion 31 slides within the lower rail body portion 21 in the front direction, the upper rail body portion 31 upwardly slides on the inclination. On the other hand, when the upper rail body portion 31 slides within the lower rail body portion 21 in the rear direction, the upper rail body portion 31 downwardly slides on the inclination. The seat-fixed portions 32 are attached to an upper portion of the upper rail body portion 31 at front and rear end portions thereof, respectively, by means of screws. A vehicle seat is attached to the upper rail 3 via the seat-fixed portions 32. The bracket-fixed portion is attached to a front end portion of the upper rail body portion 31 by means of a screw. A through-hole is formed at the bracket-fixed portion so as to fix the reinforcement bracket 56 (described later) thereat.

As illustrated in FIG. 1, the transmitting mechanism 5 includes a pair of screw shafts (a right screw shaft and a left screw shaft) 51, a pair of nut members (a right nut member and a left nut member) 52, a drive-decelerating gear mechanism 53, a pair of direction-changing gear mechanisms (a right direction-changing gear mechanism and a left direction-changing gear mechanism) 54, a transmitting shaft 55 and the reinforcement bracket 56. The left and right screw shafts 51 include substantially the same structure and function relative to each other. Therefore, only one of the left and right screw shafts 51 will be described hereinafter as an example. Similarly, the left and right nut members 52 include substantially the same structure and function relative to each other. Therefore, only one of the left and right nut members 52 will be described hereinafter as an example. Further, the left and right direction-changing gear mechanisms 54 include substantially the same structure and function relative to each other. Therefore, only one of the left and right direction-changing gear mechanisms 54 will be described hereinafter as an example. As illustrated in FIG. 2, the screw shaft 51 includes a spline 51a, a screw portion 51b and a shaft portion 51c. The spline 51a is formed at a front end portion of the screw shaft 51. The screw portion 51b is formed at an outer circumferential surface of the screw shaft 51 so as to retain a predetermined length between the spline 51a and the screw portion 51b and so as to be in front of a rear end portion of the screw shaft 51. The shaft portion 51c is formed at the rear end portion of the screw shaft 51. A diameter of the shaft portion 51c is set to be equal to a root diameter of the screw portion 51b. The screw shaft 51 is arranged within the upper rail body portion 31 so that the spline 51a protrudes from a front end of the upper rail body portion 31 and so as to extend in the front-rear direction. A front portion of the screw shaft 51 is rotatably supported by a holding member 511 while a rear portion of thereof is screwed through the nut member 52. A bolt 511a, which is integrally formed with the holding member 511, is arranged so as to protrude through a bolt hole 31a, formed at an upper surface of the upper rail body portion 31. A holding nut 511b is provided to the bolt 511a so that the bolt 511a is screwed through the holding nut 511b, thereby fixing the holding member 511 to the upper rail body portion 31. Further, the slide-resistance applying device 8 (described later) is arranged between the holding member 511 of the screw shaft 51 and the nut member 52.

As illustrated in FIG. 2, the nut member 52 is fixed at an inner portion of the lower rail body portion 21. The screw portion 51b is screwed through the nut member 52. Female screw holes 521a are formed at base portions 521 of the nut member 52, respectively. Male screws 521b are screwed through the corresponding female screw holes 521a via screw holes 21a, formed at a bottom surface of the lower rail body portion 21, thereby fixing the nut member 52 at the lower rail body portion 21. When the screw shaft 51 is rotated, the screw shaft 51 is displaced relative to the nut member 52, fixed at the lower rail body portion 21, and the screw shaft 51 moves in the front-rear direction. Accordingly, the upper rail body portion 31, which supports the screw shaft 51, also slides in the front-rear direction.

Figure 3:
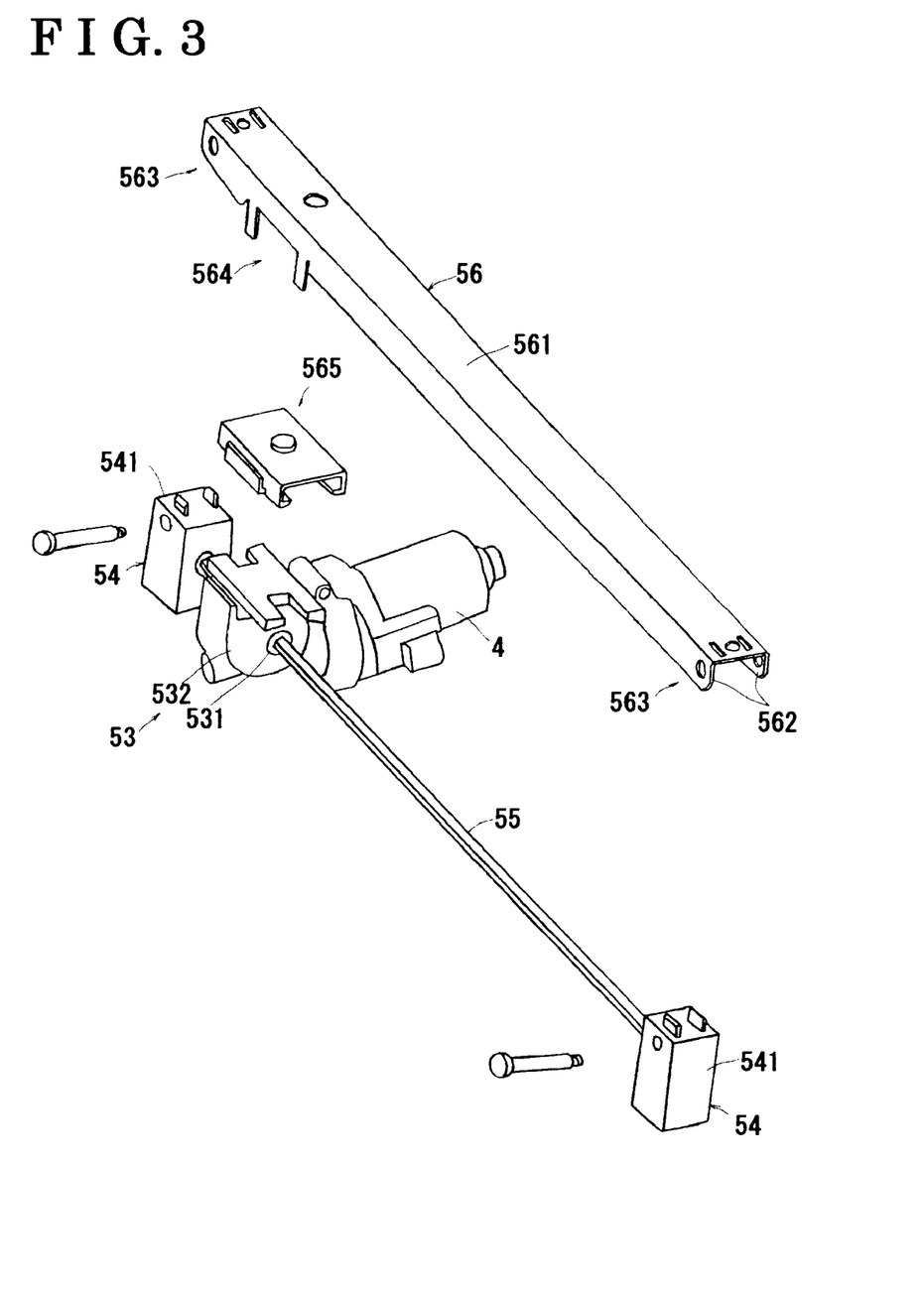
FIG. 3 is an exploded perspective view illustrating a driving portion of the seat slide apparatus for the vehicle shown in FIG. 1.

As illustrated in FIG. 3, the drive-decelerating gear mechanism 53 decelerates a rotational force, inputted from the motor 4 to an input gear of the drive-decelerating gear mechanism 53, such as a worm and the like, and transmits the decelerated rotational force through an output gear 531 of the drive-decelerating gear mechanism 53, such as a wheel and the like, to the transmitting shaft 55. More specifically, the input gear, driven so as to rotate by means of the motor 4, and the output gear 531, engaged with the input gear, are accommodated within the housing 532, at which the motor 4 is fixed, so as to be rotatably supported thereat. The drive-decelerating gear mechanism 53 is arranged at one side of the transmitting shaft 55 in a width direction thereof. The transmitting shaft 55 extends through the output gear 531 so that a relative rotation therebetween is restricted. The housing 532 is fixed to the reinforcement bracket 56 (described later) via a damper 565, having an elastic range.

As illustrated in FIGS. 1 to 3, the right and left direction-changing gear mechanisms 54 are fixed to the right and left upper rails 3, respectively. The direction-changing gear mechanism 54 transmits the rotational force, inputted into an input gear of the direction-changing gear mechanism 54 from the transmitting shaft 55, to the screw shaft 51 via an output gear of the direction-changing gear mechanism 54. In other words, the direction-changing gear mechanism 54 changes a rotational direction of the rotational force, inputted from the transmitting shaft 55, into a rotational direction of the screw shaft 51, extending in the front-rear direction. More specifically, worm gears, serving as the input gear and the output gear, are arranged at an inside of a casing 541 and supported thereby so as to be rotatable in a manner where the input gear and the output gear are engaged with each other in a state where rotational axes thereof extending orthogonally relative to each other. A hexagonal-shaped bottomed hole, with which the transmitting shaft 55 is engageable, is formed at a rotational center of the input gear so that the input gear and the transmitting shaft 55 are engaged with each other in their rotational direction and so that a displacement between the input gear and the transmitting shaft 55 in a width direction of the transmitting shaft 55 is restricted. Further, the output shaft is spline-engaged with the front end of the screw shaft 51.

A length of the transmitting shaft 55 is set so that the transmitting shaft 55 extends between the right and left direction-changing gear mechanisms 54, fixed at the right and left upper rail body portion 31, respectively. Further, the transmitting shaft 55 is formed to include a substantially hexagonal-shaped cross section. The transmitting shaft 55 rotates integrally with the output gear 531 of the drive-decelerating gear mechanism 53, and transmits the rotational force to the right and left direction-changing gear mechanisms 54, fixed to both ends of the transmitting shaft 55, respectively.

As illustrated in FIG. 3, the reinforcement bracket 56 is arranged above the drive-decelerating gear mechanism 53 and the direction-changing gear mechanisms 54 so as to fix and support the drive-decelerating gear mechanism 53 and the direction-changing gear mechanisms 54. The reinforcement bracket 56 includes a reinforcement bracket main portion 561 and side flanges 562, extending from front and rear ends of the reinforcement bracket main portion 561, thereby being formed to include a substantially inverted U-shaped cross-section for surrounding the transmitting shaft 55. The reinforcement bracket 56 includes fixing portions 563 for fixing and supporting the direction-changing gear mechanisms 54. The fixing portions 563 are fixed to the upper rails 3. The reinforcement bracket 56 further includes a surrounding portion 564 for fixing and supporting the drive-decelerating gear mechanism 53.

Figure 4:
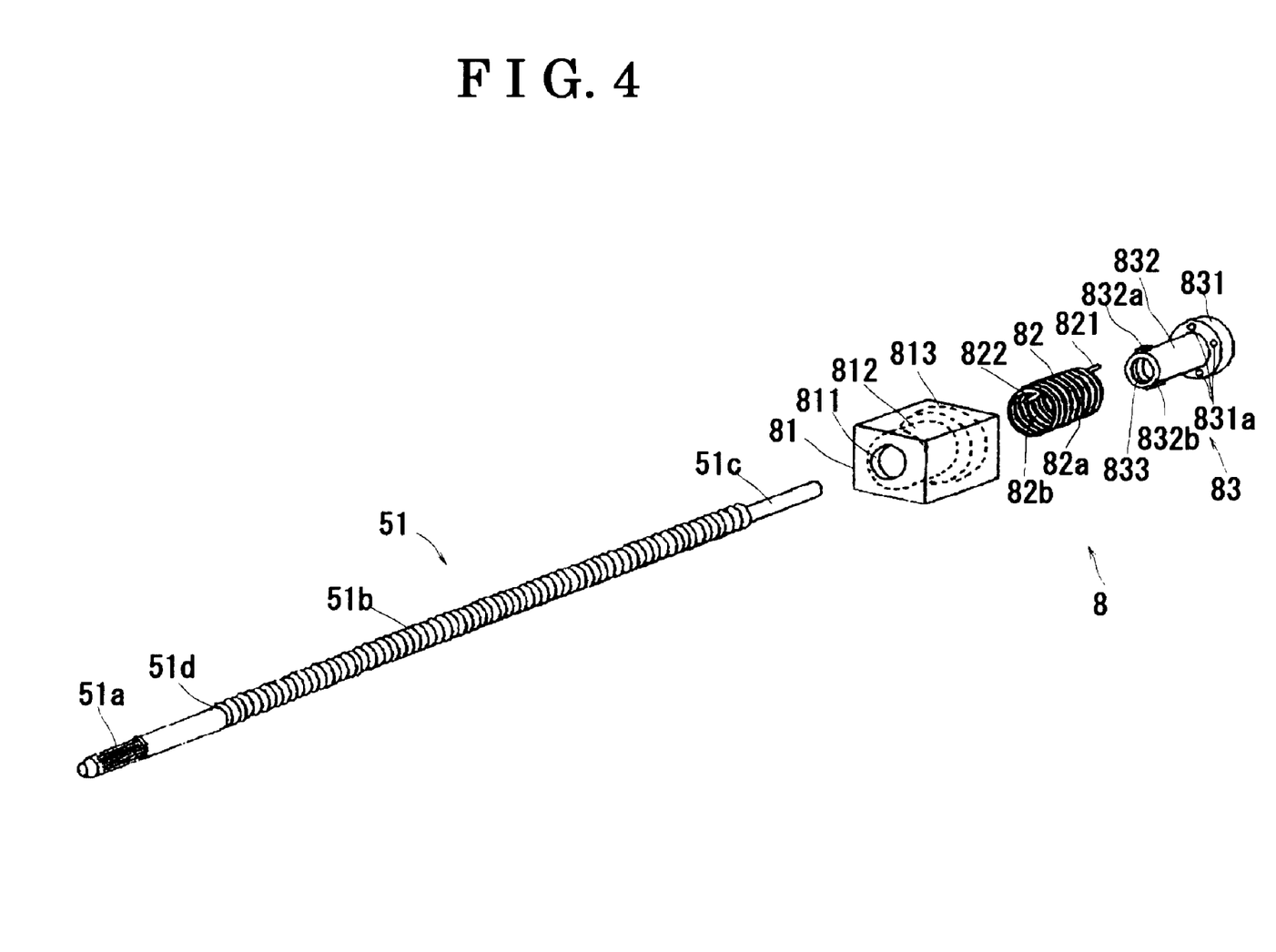
FIG. 4 is an exploded perspective view illustrating a slide-resistance applying device shown in FIG. 2.
Figure 5:
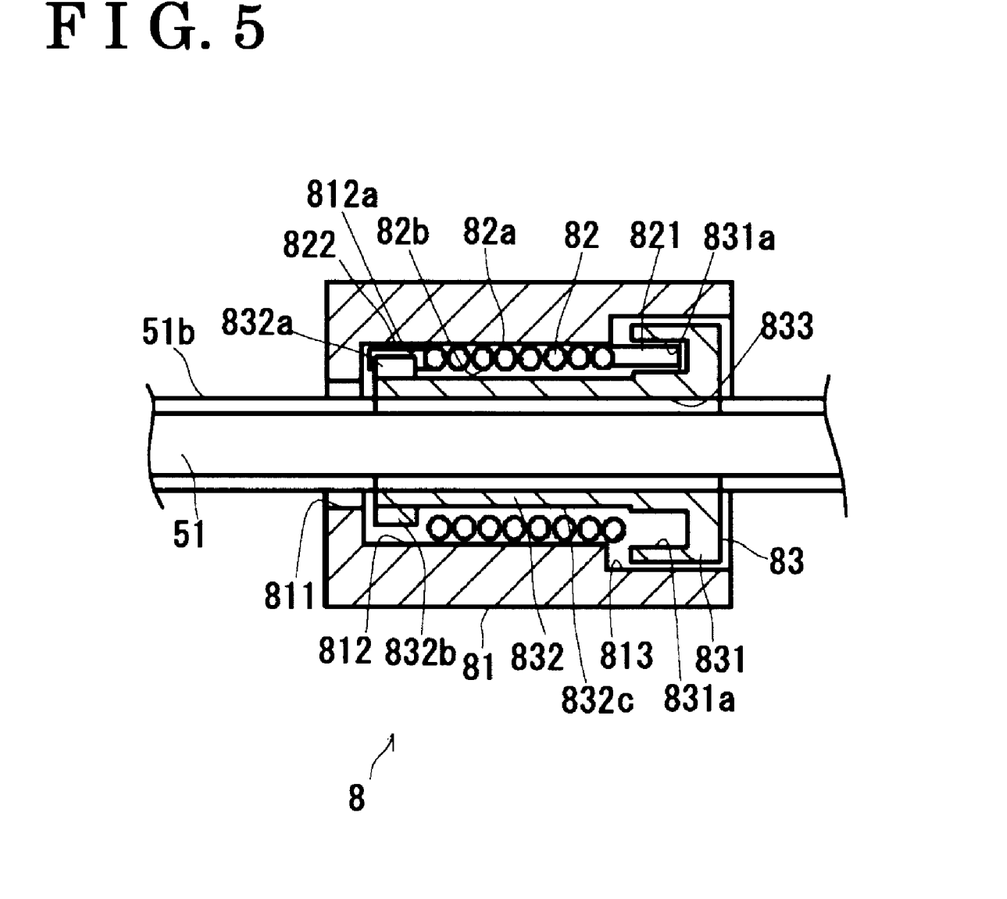
FIG. 5 is a cross-sectional view illustrating the slide-resistance applying device shown in FIG. 2, taken along line orthogonal to an axial direction.

As illustrated in FIGS. 4 and 5, the slide-resistance applying device 8 includes a box (a slide member) 81, a coil spring (a sliding member) 82 and a bush (a sliding member) 83. The box 81 is formed into a substantially square-prism shape. Further, a through-hole is formed at the box 81, through which the screw shaft 51 is inserted. More specifically, the through-hole is configured by a small-diameter hole 811, a medium-diameter hole 812 and a large-diameter hole 813, which formed in the mentioned order so as to be directly connected one another. An inner diameter of the small-diameter hole 811 is set to be slightly larger than an outer diameter of the screw shaft 51 so that an inner circumferential surface of the small-diameter hole 811 does not contact the outer circumferential surface of the screw shaft 51.

The coil spring 82 (describer later) is fitted into the medium-diameter hole 812. A diameter of the medium-diameter hole 812 is set to be slightly smaller than an outer diameter of the coil spring 82 so that an inner circumferential surface 812a of the medium-diameter hole 812 contacts an outer circumferential portion 82a of the coil spring 82 without a clearance therebetween. Consequently, the outer circumferential portion 82a of the coil spring 82 is press-fitted with the inner circumferential surface 812a of the medium-diameter hole 812. A large-diameter portion 831 of the bush 83 (describer later) is inserted into the large-diameter hole 813. A diameter of the large-diameter hole 813 is set to be slightly larger than an outer diameter of the large-diameter portion 831 of the bush 83 so that an inner circumferential surface of the large-diameter hole 813 does not contact an outer circumferential surface of the large-diameter portion 831 of the bush 83. A width of the box 81, extending orthogonally relative to an axial direction thereof, is set to be substantially the same as a length between the second side walls 311 of the upper rail body portion 31. Consequently, the box 81 is accommodated within the upper rail 3 without a clearance therebetween.

A winding direction of the coil spring 82 corresponds to an opposite direction of a rotational direction of the screw shaft 51 while the upper rail 3 is moving rearward (i.e., while the upper rail 3 is moving downwardly on the inclination). For example, while the upper rail 3 is moving rearward, the screw shaft 51 is rotated in a clockwise direction, seen from a front side, and the coil spring 82 is wound in the counter-clockwise direction, seen from the front side. First and second end portions 821 and 822 of the coil spring 82 are bent orthogonally and outwardly along an axis of the coil spring 82. A small-diameter portion 832 of the bush 83 is inserted through an inner circumferential portion 82b of the coil spring 82. An inner diameter of the coil spring 82 is set to be slightly larger than an outer diameter of the small-diameter portion 832 so that a clearance is provided between the inner circumferential portion 82b of the coil spring 82 and an outer circumferential surface 832c of the small-diameter portion 832 of the bush 83. A slide resistance is generated between the outer circumferential portion 82a of the coil spring 82 and the inner circumferential surface 812a of the medium-diameter hole 812. Therefore, a level of the slide resistance may be adjusted by changing a length of the coil spring 82.

The bush 83 includes the large-diameter portion 831, formed into a substantially cylindrical shape, and the small-diameter portion 832, formed into a substantially cylindrical shape integrally with the large-diameter portion 831. Engagement holes (engagement portions) 831a are formed at an end surface of the large-diameter portion 831 facing the small-diameter portion 832. The first end portion of the coil spring 82 is inserted into and engaged with one of the engagement holes 831a. First and second contacting portions (a contacting portion) 832a and 832b are formed to protrude from an circumferential surface of an end portion of the small-diameter portion 832 to be away from each other by substantially 180 degrees. When the bush 83 is rotated by a predetermined angle, the second end portion 822 of the coil spring 82 contacts the first or second contacting portion 832a or 832b. In a state where the coil spring 82 is inserted into the small-diameter portion 832 of the bush 83 and where the first end portion 821 of the coil spring 82 is inserted into and engaged with the engagement hole 831a of the bush 83, a position of the second end portion 822 of the coil spring 82 is set at a circumferential surface between the first and second contacting portions 832a and 832b to be away from the first and second contacting portions 832a and 832b. According to the embodiment, the plurality of engagement holes 831a is formed at the bush 83. More specifically, four engagement holes 831a are formed at the bush 83. A level of the slide resistance is determined according to a rotational angle of the second end portion 822 of the coil spring 82 relative to the bush 83. Therefore, the level of the slide resistance may be adjusted by changing the engagement holes 831a, which the first end portion 821 of the coil spring 82 is inserted into and engaged with. Accordingly, one of the engagement holes 831a may be selected based on the rotational angle of the coil spring 82 relative to the bush 83 in order to obtain a desired level of the slide resistance, thereby removing a necessity of modification of the coil spring 82. Further, only one engagement hole 831a may be formed at the bush 83 instead of the plurality of engagement holes 831a.

A female screw portion 833, through which the screw shaft 51 is screwed, is formed at a central portion of the bush 83. The bush 83 is fixed at the screw shaft 51 so as to be integrally rotatable therewith. For example, the female screw portion 833 is fastened to the screw shaft 51 so that the screw shaft 51 is screwed through the female screw portion 833 until the female screw portion 833 contacts an incomplete screw portion 51d, formed at an end portion of the screw portion 51b of the screw shaft 51, thereby fixing the bush 83 to the screw shaft 51. Further, a through-hole, through which the screw shaft 51 is screwed, may be formed at the bush 83 instead of the female screw portion 833, formed at the central portion of the bush 83. In such a case, the bush 83 is fixed to the screw shat 51 by means of a pin. According to the embodiment, a track unit is configured by the lower rails 2, the upper rails 3, the screw shafts 51, the nut members 52, the slide-resistance applying devices 8 and the like.

According to the above-described configuration of the seat slide apparatus 1 for the vehicle, the seat for the vehicle is moved in the following manner. First, the motor 4 is driven, and a rotation of the motor 4 is decelerated by means of the drive-decelerating gear mechanism 53. Then, the decelerated rotation is transmitted by means of the transmitting shaft 55, which extends through the output gear 531 of the drive-decelerating gear mechanism 53. In accordance with the rotation of the transmitting shaft 55, the right and left direction-changing gear mechanisms 54, which are connected to the transmitting shaft 55, are rotated. The rotation about the axis extending in the right-left direction is changed to a rotation about the axis extending in the front-rear direction by means of the direction-changing gear mechanisms 54, and the rotation, whose direction is changed, is outputted through the output gears of the direction-changing gear mechanisms 54. The drive-decelerating gear mechanism 53, the left and right direction-changing gear mechanism 54 and the upper rail body portion 31 are integrated by means of the reinforcement bracket 56, which includes a large strength. Therefore, a misalignment of axes of the left and right direction-changing gear mechanism 54 may be restricted.

Subsequently, in accordance with the rotation of the screw shaft 51, which are connected to the output gear of the direction-changing gear mechanism 54, the relative rotation between the screw portion 51b of the screw shaft 51 and the nut member 52 is changed to a displacement of the screw portion 51b of the screw shaft 51 relative to the nut member 52 in the axial direction of the screw shaft 51. The nut member 52 is fixed to the lower rail 2. Therefore, the screw shaft 51 is moved relative to the nut member 52 in the front-rear direction. Consequently, the upper rail 3 slides relative to the lower rail 2.

When the screw shaft 51 is rotated so that the upper rail 3 moves in the rear direction (in a direction for moving the upper rail 3 downwardly on the inclination), the bush 83 is also rotated integrally with the screw shaft 51 in the same direction as the screw shaft 51. At that time, the outer circumferential portion 82a of the coil spring 82 is press-fitted with the inner circumferential surface 812a of the medium-diameter hole 812 of the box 81, and the first end portion 821 of the coil spring 82 is engaged with the engagement hole 831a of the bush 83. Therefore, the coil spring 82 is dragged to rotate in the same direction as the bush 83. Further, the coil spring 82 is wound in the opposite direction from the rotational direction, for example, in the counter-clockwise direction when seen from the front side. Therefore, a force is applied to the coil spring 82 in a direction where a diameter thereof is expanded. Accordingly, a diameter of a portion of the coil spring 82 (i.e., two winds on the first end portion 821 side) is expanded, and a press-fitting force of the remaining portion of the outer circumferential portion 82a of the coil spring 82 relative to the inner circumferential surface 812a of the medium-diameter hole 812 of the box 81 is increased. As a result, the slide resistance is increased.

When the second end portion 822 of the coil spring 82 is rotated relative to the bush 83 by a predetermined angle, the second end portion 822 of the coil spring 82 contacts the first contacting portion 832a of the bush 83. Then, the coil spring 82 and the bush 83 are rotated integrally with each other. In other words, the press-fitting force of the outer circumferential portion 82a of the coil spring 82 relative to the inner circumferential surface 812a of the medium-diameter hole 812 does not increase unlimitedly but increases until reaching a predetermined level. Accordingly, the slide resistance between the outer circumferential portion 82a of the coil spring 82 and the inner circumferential surface 812a of the medium-diameter hole 812 is maintained to be in the predetermined increased state. As a result, a stop of the motor 4 due to an excessive increase of the slide resistance may be restricted. The upper rail 3 slides in a direction for moving downwardly on the inclination in a state where the increased slide resistance is applied. Therefore, the rotation of the motor 4 is decelerated. Further, the slide-resistance applying devices 8 are provided to the right and left screw shafts 51, respectively. Therefore, a sliding balance between the right and left upper rails 3 may be appropriately maintained.

When the screw shaft 51 is rotated so that the upper rail 3 moves in the front direction (in a direction for moving the upper rail 3 upwardly on the inclination), the bush 83 is also rotated integrally with the screw shaft 51 in the same direction as the screw shaft 51. At that time, the outer circumferential portion 82a of the coil spring 82 is press-fitted with the inner circumferential surface 812a of the medium-diameter hole 812 of the box 81, and the first end portion 821 of the coil spring 82 is engaged with the engagement hole 831a of the bush 83. Therefore, the coil spring 82 is dragged to rotate in the same direction as the bush 83. Further, the coil spring 82 is wound in the rotational direction. Therefore, a force in a diameter-reduction direction is applied to the coil spring 82. A clearance is provided between the inner circumferential portion 82b of the coil spring 82 and the outer circumferential surface 832c of the small-diameter portion 832 of the bush 83. Therefore, the diameter of the coil spring 82 is reduced. As a result, the press-fitting force between the outer circumferential portion 82a of the coil spring 82 and the inner circumferential surface 812a of the medium-diameter hole 812 of the box 81 is reduced, thereby reducing the slide resistance.

When the second end portion 822 of the coil spring 82 is rotated relative to the bush 83 by a predetermined angle, the second end portion 822 of the coil spring 82 contacts the second contacting portion 832b of the bush 83. Then, the coil spring 82 and the bush 83 are rotated integrally with each other. In other words, the press-fitting force between the outer circumferential portion 82a of the coil spring 82 and the inner circumferential surface 812a of the medium-diameter hole 812 is maintained to be in a decreased state. Accordingly, the slide resistance between the outer circumferential portion 82a of the coil spring 82 and the inner circumferential surface 812a of the medium-diameter hole 812 is maintained to be in the predetermined decreased state. The upper rail 3 slides in a direction for moving upwardly on the inclination in a state where the decreased slide resistance is applied. Therefore, the rotation of the motor 4 is accelerated. Further, the slide-resistance applying devices 8 are provided to the right and left screw shafts 51, respectively. Therefore, a sliding balance between the right and left upper rails 3 may be appropriately maintained.

As described above, when the seat for the vehicle moves relative to the floor of the vehicle in the rear direction (in the direction where the upper rail 3 moves downwardly on the inclination), a large slide resistance is generated. On the other hand, when the seat for the vehicle moves relative to the floor of the vehicle in the front direction (in the direction where the upper rail 3 moves upwardly the inclination), a small slide resistance is generated. Therefore, moving speeds of the seat for the vehicle in the front and rear directions are set to be substantially equal. Accordingly, a speed difference between the front and rear movements of the seat of the vehicle may be removed, and a difference of operational noise between the front and rear movements of the seat of the vehicle may be reduced. As a result, an operational characteristic may be obtained where a difference between the front and rear movements of the seat of the vehicle is reduced.

[Second Embodiment]

Figure 6:
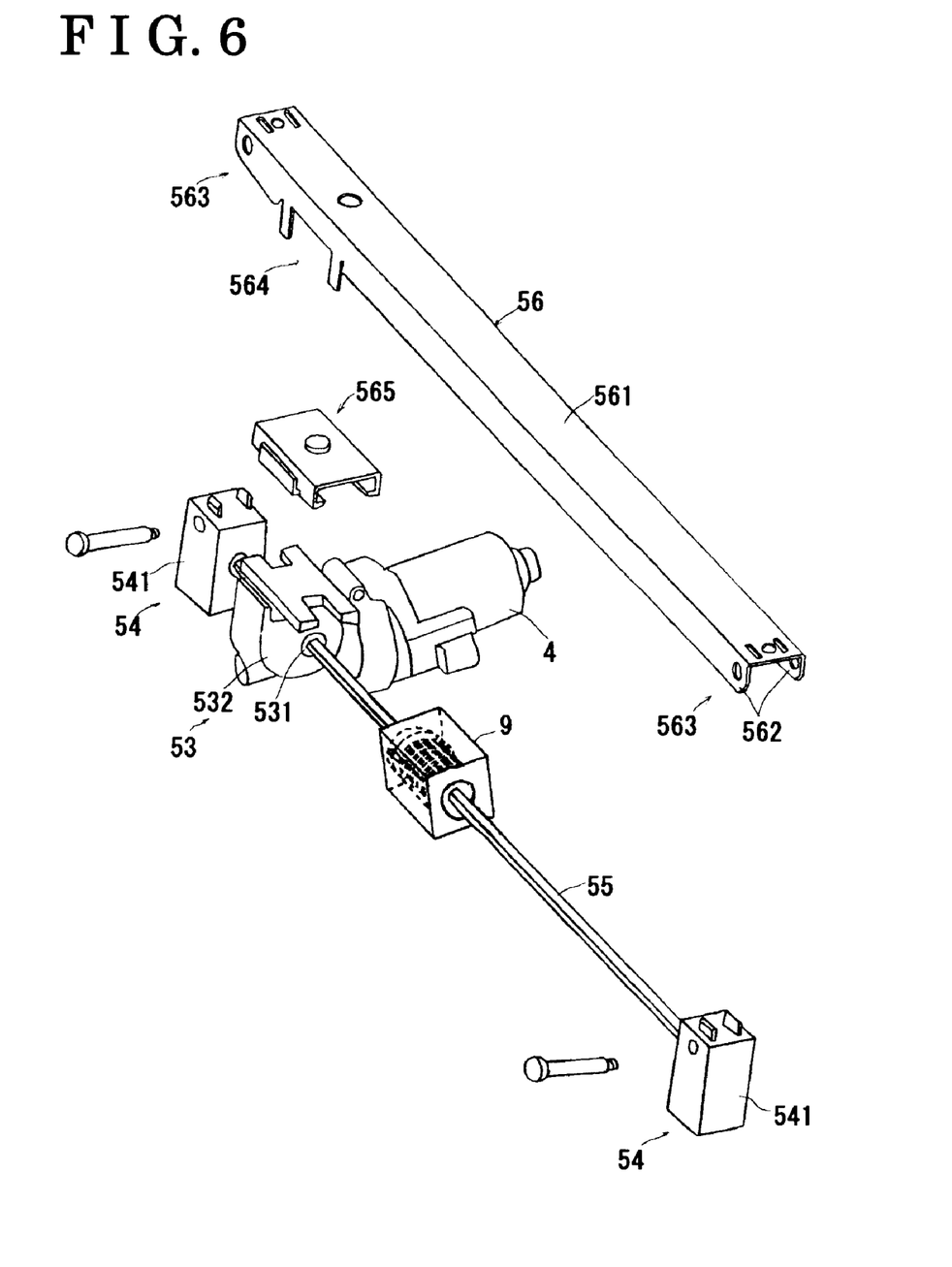
FIG. 6 is an exploded perspective view illustrating a driving portion of the seat slide apparatus for the vehicle according to a second embodiment.
Figure 7:
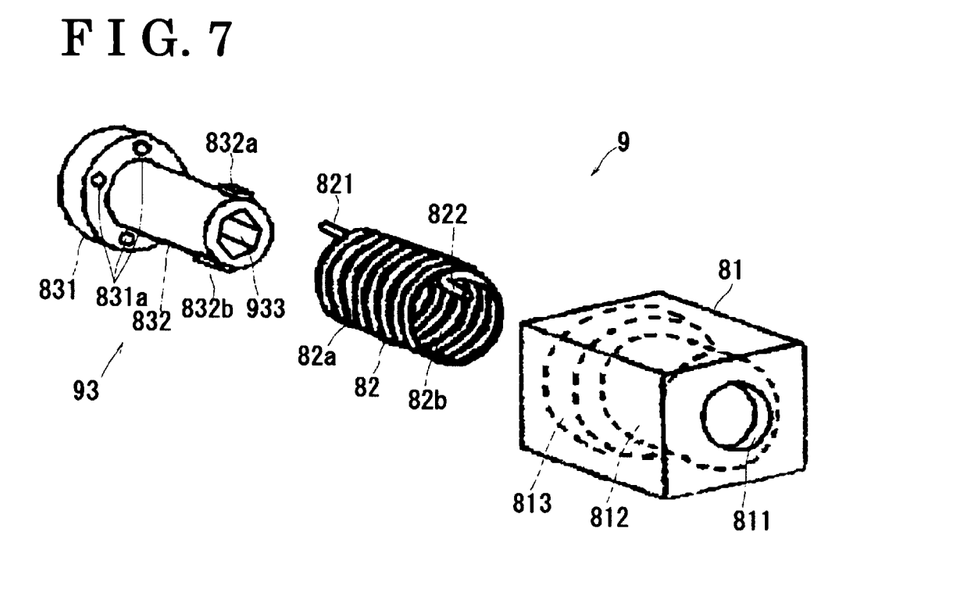
FIG. 7 is an exploded perspective view illustrating a slide-resistance applying device shown in FIG. 6.
Figure 8:
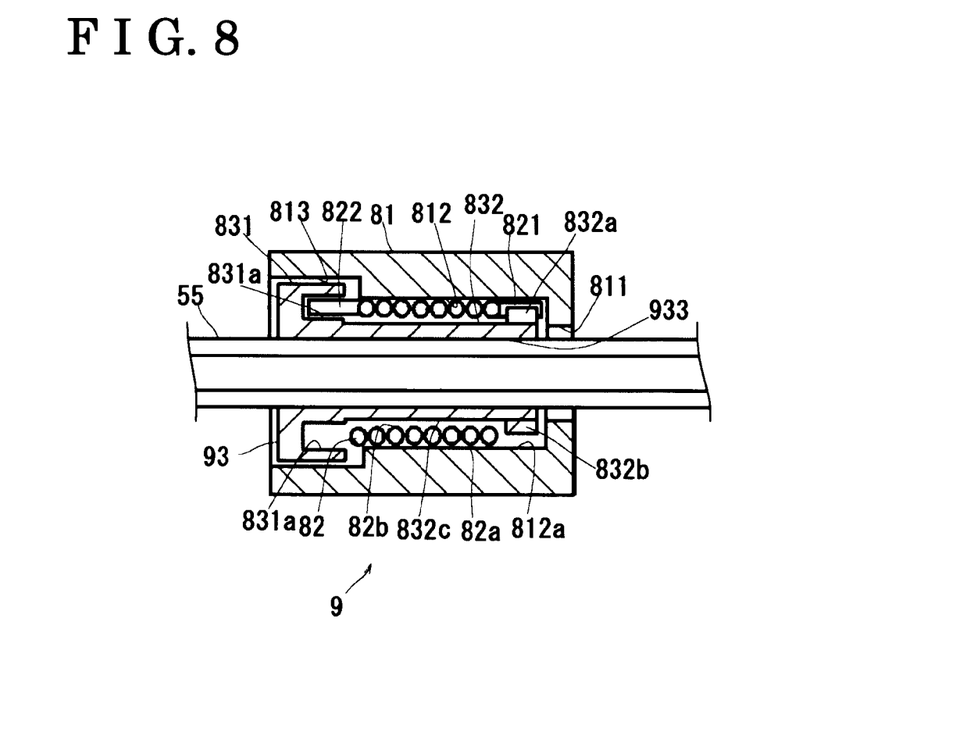
FIG. 8 is a cross-sectional view illustrating the slide-resistance applying device shown in FIG. 6, taken along line orthogonal to an axial direction.

The seat slide apparatus for the vehicle according to a second embodiment will be described hereinafter with reference to FIGS. 6 to 8. In the following description, the configurations being similar to the first embodiment are referred to with the same reference numerals. Further, detailed descriptions for the similar configurations will be omitted and only different configurations will be described in detail. In the first embodiment, the slide-resistance applying device 8 is provided at the screw shaft 51. However, in the second embodiment, a slide-resistance applying device 9 is provided at the transmitting shaft 55. Therefore, the box 81 and the coil spring 82 of the slide-resistance applying device 9 are configured to be similar to that of the first embodiment while a bush 93 is configured to be different from that of the first embodiment.

The large-diameter portion 831, the small-diameter portion 832, the engagement hole 831a, the first and second contacting portions 832a and 832b of the bush 93 are configured to be similar to that of the bush 83 according to the first embodiment. However, the bush 93 differs from the bush 83 according to the first embodiment in that a through-hole 933, formed at a central portion of the bush 93, includes a substantially hexagonal-shaped cross section when seen in the orthogonal direction to an axial direction of the bush 93 so as to correspond to the hexagonal-shaped cross section of the transmitting shaft 55 when seen in orthogonal direction to the axial direction of the transmitting shaft 55. Therefore, in accordance with the rotation of the transmitting shaft 55, the bush 93 rotates integrally therewith. Similarly to the slide-resistance applying device 8 of the first embodiment, the slide-resistance applying device 9, configured as described above, is operated to apply a large slide-resistance when the transmitting shaft 55 is rotated in a direction where the upper rail 3 is moved in the rear direction (in the direction for moving the upper rail 3 down on the inclination), while the slide-resistance applying device 9 is operated to apply a small slide-resistance when the transmitting shaft 55 is rotated in a direction where the upper rail 3 is moved in the front direction (in the direction for moving the upper rail 3 up on the inclination). Further, according to the second embodiment, a drive-transmitting unit is configured by the drive-decelerating gear mechanism 53, the direction-changing gear mechanisms 54, the transmitting shaft 55, the reinforcement bracket 56, the slide-resistance applying device 9 and the like.

The first and second embodiments of the seat slide apparatus 1 for the vehicle have been described so far. However, the embodiments may be modified as follows. According to the first and second embodiments, the screw shaft 51 is attached to the upper rail 3, serving as a first rail while the nut member 52 is attached to the lower rail 2, serving as a second rail. Alternatively, the screw shaft 51 may be attached to the lower rail 2, serving as the first rail while the nut member 52 may be attached to the upper rail 3, serving as the second rail.

According to the first and second embodiments, the slide member of the slide-resistance applying device 8 or 9 is configured by the box 81 while the sliding member thereof is configured by a combination of the coil spring 82 and the bush 83 or 93. Alternatively, each of the slide member and the sliding member may be configured by different members as long as the sliding member applies the slide resistance relative to the slide member. Further, according to the first and second embodiments, the slide-resistance applying device 8 or 9 increases/decreases the slide resistance to a predetermined value within a short time after the motor 4 starts to be driven. Alternatively, the application of the slide resistance may be switched between ON and OFF by means of a one-way clutch at the time of start of the driving of the motor 4.

According to the first and second embodiments, a seat slide apparatus 1 for a vehicle includes: a plurality of lower rails 2 adapted to be fixed at a floor of the vehicle in an inclining manner in a longitudinal direction of the lower rails 2 relative to a horizontal surface of the floor of the vehicle; a plurality of upper rails 3 adapted to be slidably supported by the lower rails 2, respectively, and to support a seat for the vehicle; a motor 4 generating a driving force for moving the upper rails 3 in a manner where the upper rails 3 slide relative to the corresponding lower rails 2; a transmitting mechanism 5 transmitting the driving force of the motor 4 to the upper rails 3; and at least one slide-resistance applying device 8 or 9 provided in the transmitting mechanism 5 and applying an increased slide resistance to the transmitting mechanism 5 when the upper rails 3 move to slide downwardly on the inclination while applying a decreased slide resistance to the transmitting mechanism 5 when the upper rails 3 move to slide upwardly on the inclination.

Because the slide-resistance applying device 8 or 9 is provided in the transmitting mechanism 5, the slide-resistance applying device 8 or 9 may apply an increased slide resistance to the transmitting mechanism 5 when the pair of upper rails 3 move to slide downwardly on the inclination while the slide-resistance applying device 8 or 9 may apply a decreased slide resistance to the transmitting mechanism 5 when the pair of upper rails 3 move to slide upwardly on the inclination. Consequently, an amount of increase and decrease of the slide resistance are set so that moving speeds of the pair of upper rails 3 sliding downwardly and upwardly on the inclination are equal to each other. Accordingly, the difference of operational noise during the sliding movement may be reduced, thereby removing the difference of the operational characteristic between the upward and downward movement of the pair of upper rails 3 sliding on the inclination.

According to the first embodiment, the transmitting mechanism 5 includes a plurality of screw shafts 51 rotatably supported by one of the upper rails 3 and the lower rails 2 respectively, and a plurality of nut members 52 through which the screw shafts 51 are screwed, respectively, fixed at the other one of the upper rails 3 and the lower rails 2. The slide-resistance applying device 8 includes a slide member 81 fixed at either one of the upper rails 3 or one of the lower rails 2 for supporting one of the screw shafts 51 and a sliding member 82 and 83 press-fitted with the slide member 81 and engaged with one of the screw shafts 51 the sliding member 82, 83 and 93 increasing the slide resistance by rotating integrally with one of the screw shafts 51 in order to increase a press-fitting force relative to the slide member 81 when one of the screw shafts 51 is rotated in a direction where one of the upper rails 3 is moved to slide downwardly on the inclination, and decreasing the slide resistance by rotating integrally with one of the screw shafts 51 in order to decrease the press-fitting force relative to the slide member 81 when one of the screw shafts 51 is rotated in a direction where one of the upper rails 3 is moved to slide upwardly on the inclination.

When the screw shaft 51 is rotated in a direction where the upper rails 3 are moved to slide downwardly on the inclination, the coil spring 82 and the bush 83 increase the press-fitting force relative to the box 81. On the other hand, when the screw shaft 51 is rotated so that the pair of upper rails 3 are moved to slide upwardly on the inclination, the coil spring 82 and the bush 83 decrease the press-fitting force relative to the box 81. Accordingly, the press-fitting force is adjusted, and thereby equalizing the moving speeds of the pair of upper rails 3 sliding downwardly and upwardly on the inclination.

According to the first embodiment, a track unit is configured by the lower rails 2 the upper rails 3 the screw shafts 51 and the nut members 52 the screw shafts 51 and the nut members 52 being provided within the lower rails 2 and the upper rails 3 and the slide-resistance applying device 8 or 9. Each of the screw shafts 51 each of the nut members 52 and the slide-resistance applying device 8 or 9 are accommodated in a spaced portion defined by each of the lower rails 2 and each of the upper rails 3.

The pair of screw shafts 51, the nut members 52, and the slide-resistance applying devices 8 are arranged within the corresponding lower rails 2 and the corresponding upper rails 3. Therefore, the pair of screw shafts 51, the nut members 52, and the slide-resistance applying devices 8 are accommodated in one of the corresponding lower and upper rails 2 and 3. Accordingly, the seat slide apparatus 1 for the vehicle may be downsized.

According to the first embodiment, the slide-resistance applying device 8 is provided to each of the screw shafts 51.

The slide-resistance applying device 8 is provided to each of the pair of right and left screw shafts 51. Therefore, a sliding balance between the pair of right and left upper rails 3 may be suitably maintained.

According to the second embodiment, the transmitting mechanism 5 includes a plurality of screw shafts 51 rotatably supported to one of the upper rails 3 and the lower rails 2 respectively, a plurality of nut members 52 through which the screw shafts 51 are screwed, respectively, fixed at the other one of the upper rails 3 and the lower rails 2 a drive-decelerating gear mechanism 53 supported by a housing 532 and rotatably connected to an output shaft of the motor 4, a plurality of direction-changing gear mechanisms 54 supported by a plurality of casings 541 respectively, and rotatably connected to the screw shafts 51 respectively, a transmitting shaft 55 provided so as to extend through an output gear of the drive-decelerating gear mechanism 53 connected to the output gear of the drive-decelerating gear mechanism 53 so as to integrally rotate therewith, and connected to input gears of the direction-changing gear mechanisms 54 at both end portions thereof, and a reinforcement bracket 56 fixed at one of the upper rails 3 and the lower rails 2 for supporting the screw shafts 51 respectively, and supporting the housing 532 and the casings 541. The slide-resistance applying device 9 includes a slide member 81 fixed at the reinforcement bracket 56 and a sliding member 82 and 93 press-fitted with the slide member 81 and engaged with the transmitting shaft 55 the sliding member 82 and 93 increasing the slide resistance by rotating integrally with the transmitting shaft 55 in order to increase the press-fitting force relative to the slide member 81 when the transmitting shaft 55 is rotated in a direction where the upper rail 3 is moved to slide downwardly on the inclination, and decreasing the slide resistance by rotating integrally with the transmitting shaft 55 in order to decrease the press-fitting force relative to the slide member 81 when the transmitting shaft 55 is rotated in a direction where the upper rail 3 is moved to slide upwardly on the inclination.

When the transmitting shaft 55 is rotated in a direction where the upper rails 3 are moved to slide downwardly on the inclination, the coil spring 82 and the bush 83 increase the press-fitting force relative to the box 81. On the other hand, when the transmitting shaft 55 is rotated in a direction where the upper rails 3 are moved to slide upwardly on the inclination, the coil spring 82 and the bush 83 decrease the press-fitting force relative to the box 81. Accordingly, the press-fitting force is adjusted, and thereby equalizing the moving speeds of the pair of upper rails 3 sliding downwardly and upwardly on the inclination. Further, in a case where the slide-resistance applying device 9 is provided to the transmitting shaft 55, only one slide-resistance applying device 9 is required. Therefore, compared to a case where the slide-resistance applying device 8 is applied to the pair of right and left screw shafts 51, a component cost and an assembly cost may be reduced.

According to the second embodiment, a drive-transmitting unit is configured by the drive-decelerating gear mechanism 53 the direction-changing gear mechanisms 54 the transmitting shaft 55 the reinforcement bracket 56 and the slide-resistance applying device 9. The drive-decelerating gear mechanism 53 the transmitting shaft 55 and the slide-resistance applying device 9 are arranged so as to be covered by the reinforcement bracket 56.

The drive-decelerating gear mechanism 53, the transmitting shaft 55, and the slide-resistance applying device 9, are arranged so as to be surrounded by reinforcement bracket 56. Therefore, influence of an external force for interrupting rotation of the drive-decelerating gear mechanism 53, the transmitting shaft 55, and the slide-resistance applying device 9 may be reduced. Specifically, the transmitting shaft 55 is a rotating member and is arranged below the seat for the vehicle, so that the occupant may approach close to the transmitting shaft 55. Therefore, the reduction of the influence of the external force for interrupting the rotation of the transmitting shaft 55 enhances safety and ensures the operation of transmitting functions. A shape of the reinforcement bracket 56 may be set to surround a portion close to the transmitting shaft 55 when seen in the front-rear direction of the seat for the vehicle. Further, a shape of the reinforcement bracket 56 may be set to surround the drive-decelerating gear mechanism 53, the transmitting shaft 55, and the slide-resistance applying device 9. Therefore, a bending resistance may be increased. Accordingly, displacement of the axes of the pair of lower or upper rails 2 or 3 may be restricted.

According to the first embodiment, the sliding member 82 and 83 includes a coil spring 82 press-fitted with an inner circumferential surface 812a of the slide member 81 and a bush 83 inserted through an inner circumference of the coil spring 82 engaged with one of the screw shafts 51 and formed with an engagement portion 831a with which a first end portion 821 of the coil spring 82 is engaged. The bush 83 increases the slide resistance by rotating integrally with one of the screw shafts 51 in order to increase the press-fitting force relative to the slide member 81 when one of the screw shafts 51 is rotated in a direction where the upper rail 3 is moved to slide downwardly on the inclination, and decreases the slide resistance by rotating integrally with one of the screw shafts 51 in order to decrease the press-fitting force relative to the slide member 81 when one of the screw shafts 51 is rotated in a direction where the upper rail 3 is moved to slide upwardly on the inclination.

Further, according to the second embodiment, the sliding member 82 and 93 includes a coil spring 82 press-fitted with an inner circumferential surface 812a of the slide member 81 and a bush 93 inserted through an inner circumference of the coil spring 82 engaged with the transmitting shaft 55 and formed with an engagement portion 831a with which a first end portion 821 of the coil spring 82 is engaged. The bush 93 increases the slide resistance by rotating integrally with the transmitting shaft 55 in order to increase the press-fitting force relative to the slide member 81 when the transmitting shaft 55 is rotated in a direction where the upper rail 3 is moved to slide downwardly on the inclination, and decreases the slide resistance by rotating integrally with the transmitting shaft 55 in order to decrease the press-fitting force relative to the slide member 81 when either one of the transmitting shaft 55 is rotated in a direction where the upper rail 3 is moved to slide upwardly on the inclination.

When either the screw shafts 51 or the transmitting shaft 55 are/is rotated so that the upper rails 3 are moved to slide downwardly on the inclination, the bush 83 or 93 is also rotated in the same direction integrally with either the screw shafts 51 or the transmitting shaft 55. Further, the coil spring 82 is dragged to be rotated in the same direction, so that a force is applied to the coil spring 82 in a direction where a diameter thereof is expanded. Accordingly, a press-fitting force of the outer circumferential portion 82a of the coil spring 82 relative to the inner circumferential surface 812a of the box 81 is increased, thereby increasing the slide resistance. On the other hand, when either the screw shafts 51 or the transmitting shaft 55 are/is rotated so that the upper rails 3 are moved to slide upwardly on the inclination, the bush 83 or 93 is also rotated in the same direction integrally with either the screw shafts 51 or the transmitting shaft 55. Further, the coil spring 82 is dragged to be rotated in the same direction, so that a force is applied to the coil spring 82 in a direction where a diameter thereof is reduced. Accordingly, a press-fitting force of the outer circumferential portion 82a of the coil spring 82 relative to the inner circumferential surface 812a of the box 81 is decreased, thereby decreasing the slide resistance. As a result, the press-fitting force is adjusted, and thereby equalizing the moving speeds of the pair of upper rails 3 sliding downwardly and upwardly on the inclination.

According to the first embodiment, first and second contacting portions 832a, 832b are formed at the bush 83, a second end portion 822 of the coil spring 82 contacts the first or second contacting portion 832a, 832b when the second end portion 822 of the coil spring 82 is rotated relative to the bush 83 by a predetermined angle. After the bush 83 is rotated integrally with one of the screw shafts 51 by the predetermined angle, the bush 83 together with the coil spring 82 are rotated integrally with one of the screw shafts 51.

Further, according to the second embodiment, first and second contacting portions 832a, 832b are formed at the bush 93 a second end portion 822 of the coil spring 82 contacts the first or second contacting portion 832a, 832b when the second end portion 822 of the coil spring 82 is rotated relative to the bush 93 by a predetermined angle. After the bush 93 is rotated integrally with the transmitting shaft 55 by the predetermined angle, the bush 93 together with the coil spring 82 is rotated integrally with the transmitting shaft 55.

When the bush 83 or 93 is rotated, the force is applied to the coil spring 82 in a direction where a diameter thereof is expanded. Consequently, a portion of the coil spring 82 is displaced away from the inner circumferential surface 812a of the box 81 so as not to be press-fitted therewith, and a diameter of the portion of the coil spring 82 is expanded. Accordingly, the press-fitting force of the remaining portion of the outer circumferential portion 82a of the coil spring 82 relative to the inner circumferential surface 812a of the box 81 is increased. As a result, the slide resistance is increased. Further, when the second end portion 822 of the coil spring 82 is rotated relative to the bush 83 or 93 by a predetermined angle, the first or second contacting portions 832a or 832b of the bush 83 or 93 contact the second end portion 822 of the coil spring 82, and subsequently, the coil spring 82 is rotated integrally with the bush 83 or 93. In other words, the press-fitting force of the outer circumferential portion 82a of the coil spring 82 relative to the inner circumferential surface 812a of the box 81 does not increase unlimitedly but increases until reaching a predetermined level. Accordingly, the slide resistance between the outer circumferential portion 82a of the coil spring 82 and the inner circumferential surface 812a of the box 81 is maintained to be in the predetermined increased state. As a result, a stop of the motor 4 due to an excessive increase of the slide resistance may be restricted. On the other hand, when the bush 83 or 93 is rotated in the other direction, the force is applied to the coil spring 82 in a direction where a diameter thereof is reduced. Consequently, the diameter of the coil spring 82 is reduced. Accordingly, the press-fitting force of the outer circumferential portion 82a of the coil spring 82 relative to the inner circumferential surface 812a of the box 81 is decreased. As a result, the slide resistance is decreased. Further, when the second end portion 822 of the coil spring 82 is rotated relative to the bush 83 or 93 by a predetermined angle, the first or second contacting portions 832a or 832b of the bush 83 or 93 contact the second end portion 822 of the coil spring 82, and subsequently, the coil spring 82 is rotated integrally with the bush 83 or 93. In other words, the press-fitting force of the outer circumferential portion 82a of the coil spring 82 may be maintained to be in a decreased state. As a result, the slide resistance between the outer circumferential portion 82a of the coil spring 82 and the inner circumferential surface 812a of the box 81 is maintained to be in the predetermined decreased state.

According to the first and second embodiments, a seat slide apparatus 1 for a vehicle includes: a plurality of lower rails 2 adapted to be fixed at a floor of the vehicle; a plurality of upper rails 3 adapted to be slidably supported by the lower rails 2 and to support a seat for the vehicle; a motor 4 generating a driving force for moving the upper rails 3 in a manner where the upper rails 3 slide relative to the corresponding lower rails 2; a transmitting mechanism 5 transmitting the driving force of the motor 4 to the upper rails 3 and a slide-resistance applying portion 8, 9 provided in the transmitting mechanism 5 and applying an increased slide resistance to the transmitting mechanism 5 when the upper rails 3 move in a first direction and applying a decreased slide resistance to the transmitting mechanism 5 when the upper rails 3 move in a second direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle comprising:
a plurality of lower rails adapted to be fixed at a floor of the vehicle in an inclining manner in a longitudinal direction of the lower rails relative to a horizontal surface of the floor of the vehicle;
a plurality of upper rails adapted to be slidably supported by the lower rails, respectively, and to support a seat for the vehicle;
a motor generating a driving force for moving the upper rails in a manner where the upper rails slide relative to the corresponding lower rails;
a transmitting mechanism transmitting the driving force of the motor to the upper rails; and
at least one slide-resistance applying portion provided in the transmitting mechanism and applying an increased slide resistance to the transmitting mechanism when the upper rails move to slide downwardly on the inclination while applying a decreased slide resistance to the transmitting mechanism when the upper rails move to slide upwardly on the inclination.

2. The seat slide apparatus for the vehicle according to claim 1, wherein the transmitting mechanism includes
a plurality of screw shafts rotatably supported by one of the upper rails and the lower rails, respectively, and
a plurality of nut members, through which the screw shafts are screwed, respectively, fixed at the other one of the upper rails and the lower rails, and wherein the slide-resistance applying portion includes
a slide member fixed at either one of the upper rails or one of the lower rails for supporting one of the screw shafts, and
a sliding member press-fitted with the slide member and engaged with one of the screw shafts, the sliding member increasing the slide resistance by rotating integrally with one of the screw shafts in order to increase a press-fitting force relative to the slide member when one of the screw shafts is rotated in a direction where one of the upper rails is moved to slide downwardly on the inclination, and decreasing the slide resistance by rotating integrally with one of the screw shafts in order to decrease the press-fitting force relative to the slide member when one of the screw shafts is rotated in a direction where one of the upper rails is moved to slide upwardly on the inclination.

3. The seat slide apparatus for the vehicle according to claim 2, wherein
a track unit is configured by the lower rails, the upper rails, the screw shafts and the nut members, the screw shafts and the nut members being provided within the lower rails and the upper rails, and the slide-resistance applying portion, and wherein
each of the screw shafts, each of the nut members and the slide-resistance applying portion are accommodated in a spaced portion defined by each of the lower rails and each of the upper rails.

4. The seat slide apparatus for the vehicle according to claim 2, wherein
the slide-resistance applying portion is provided to each of the screw shafts.

5. The seat slide apparatus for the vehicle according to claim 3, wherein
the slide-resistance applying portion is provided to each of the screw shafts.

6. The seat slide apparatus for the vehicle according to claim 1, wherein the transmitting mechanism includes a plurality of screw shafts rotatably supported to one of the upper rails and the lower rails, respectively,
a plurality of nut members, through which the screw shafts are screwed, respectively, fixed at the other one of the upper rails and the lower rails,
a drive-decelerating gear mechanism supported by a housing and rotatably connected to an output shaft of the motor,
a plurality of direction-changing gear mechanisms supported by a plurality of casings, respectively, and rotatably connected to the screw shafts, respectively,
a transmitting shaft provided so as to extend through an output gear of the drive-decelerating gear mechanism, connected to the output gear of the drive-decelerating gear mechanism so as to integrally rotate therewith, and connected to input gears of the direction-changing gear mechanisms at both end portions thereof, and
a reinforcement bracket fixed at one of the upper rails and the lower rails for supporting the screw shafts, respectively, and supporting the housing and the casings, and wherein the slide-resistance applying portion includes
a slide member fixed at the reinforcement bracket, and
a sliding member press-fitted with the slide member and engaged with the transmitting shaft, the sliding member increasing the slide resistance by rotating integrally with the transmitting shaft in order to increase the press-fitting force relative to the slide member when the transmitting shaft is rotated in a direction where the upper rail is moved to slide downwardly on the inclination, and decreasing the slide resistance by rotating integrally with the transmitting shaft in order to decrease the press-fitting force relative to the slide member when the transmitting shaft is rotated in a direction where the upper rail is moved to slide upwardly on the inclination.

7. The seat slide apparatus for the vehicle according to claim 6, wherein
a drive-transmitting unit is configured by the drive-decelerating gear mechanism, the direction-changing gear mechanisms, the transmitting shaft, the reinforcement bracket and the slide-resistance applying device, and wherein
the drive-decelerating gear mechanism, the transmitting shaft, and the slide-resistance applying device, are arranged so as to be covered by the reinforcement bracket.

8. The seat slide apparatus for the vehicle according to claim 2, wherein
the sliding member includes
a coil spring press-fitted with an inner circumferential surface of the slide member, and
a bush inserted through an inner circumference of the coil spring, engaged with one of the screw shafts, and formed with an engagement portion, with which a first end portion of the coil spring is engaged, and wherein
the bush increases the slide resistance by rotating integrally with one of the screw shafts in order to increase the press-fitting force relative to the slide member when one of the screw shafts is rotated in a direction where the upper rail is moved to slide downwardly on the inclination, and decreases the slide resistance by rotating integrally with one of the screw shafts in order to decrease the press-fitting force relative to the slide member when one of the screw shafts is rotated in a direction where the upper rail is moved to slide upwardly on the inclination.

9. The seat slide apparatus for the vehicle according to claim 3, wherein the sliding member includes
a coil spring press-fitted with an inner circumferential surface of the slide member, and
a bush inserted through an inner circumference of the coil spring, engaged with one of the screw shafts, and formed with an engagement portion, with which a first end portion of the coil spring is engaged, and wherein
the bush increases the slide resistance by rotating integrally with one of the screw shafts in order to increase the press-fitting force relative to the slide member when one of the screw shafts is rotated in a direction where the upper rail is moved to slide downwardly on the inclination, and decreases the slide resistance by rotating integrally with one of the screw shafts in order to decrease the press-fitting force relative to the slide member when one of the screw shafts is rotated in a direction where the upper rail is moved to slide upwardly on the inclination.

10. The seat slide apparatus for the vehicle according to claim 4, wherein the sliding member includes
a coil spring press-fitted with an inner circumferential surface of the slide member, and
a bush inserted through an inner circumference of the coil spring, engaged with one of the screw shafts, and formed with an engagement portion, with which a first end portion of the coil spring is engaged, and wherein
the bush increases the slide resistance by rotating integrally with one of the screw shafts in order to increase the press-fitting force relative to the slide member when one of the screw shafts is rotated in a direction where the upper rail is moved to slide downwardly on the inclination, and decreases the slide resistance by rotating integrally with one of the screw shafts in order to decrease the press-fitting force relative to the slide member when one of the screw shafts is rotated in a direction where the upper rail is moved to slide upwardly on the inclination.

11. The seat slide apparatus for the vehicle according to claim 5, wherein the sliding member includes
a coil spring press-fitted with an inner circumferential surface of the slide member, and
a bush inserted through an inner circumference of the coil spring, engaged with one of the screw shafts, and formed with an engagement portion, with which a first end portion of the coil spring is engaged, and wherein
the bush increases the slide resistance by rotating integrally with one of the screw shafts in order to increase the press-fitting force relative to the slide member when one of the screw shafts is rotated in a direction where the upper rail is moved to slide downwardly on the inclination, and decreases the slide resistance by rotating integrally with one of the screw shafts in order to decrease the press-fitting force relative to the slide member when one of the screw shafts is rotated in a direction where the upper rail is moved to slide upwardly on the inclination.

12. The seat slide apparatus for the vehicle according to claim 6, wherein the sliding member includes
a coil spring press-fitted with an inner circumferential surface of the slide member, and
a bush inserted through an inner circumference of the coil spring, engaged with the transmitting shaft, and formed with an engagement portion, with which a first end portion of the coil spring is engaged, and wherein
the bush increases the slide resistance by rotating integrally with the transmitting shaft in order to increase the press-fitting force relative to the slide member when the transmitting shaft is rotated in a direction where the upper rail is moved to slide downwardly on the inclination, and decreases the slide resistance by rotating integrally with the transmitting shaft in order to decrease the press-fitting force relative to the slide member when the transmitting shaft is rotated in a direction where the upper rail is moved to slide upwardly on the inclination.

13. The seat slide apparatus for the vehicle according to claim 7, wherein the sliding member includes
   a coil spring press-fitted with an inner circumferential surface of the slide member, and
   a bush inserted through an inner circumference of the coil spring, engaged with the transmitting shaft, and formed with an engagement portion, with which a first end portion of the coil spring is engaged, and wherein
   the bush increases the slide resistance by rotating integrally with the transmitting shaft in order to increase the press-fitting force relative to the slide member when the transmitting shaft is rotated in a direction where the upper rail is moved to slide downwardly on the inclination, and decreases the slide resistance by rotating integrally with the transmitting shaft in order to decrease the press-fitting force relative to the slide member when the transmitting shaft is rotated in a direction where the upper rail is moved to slide upwardly on the inclination.

14. The seat slide apparatus for the vehicle according to claim 8, wherein
   a contacting portion is formed at the bush,
   a second end portion of the coil spring contacts the contacting portion when the second end portion of the coil spring is rotated relative to the bush by a predetermined angle,
   and wherein after the bush is rotated integrally with one of the screw shafts by the predetermined angle, the bush together with the coil spring are rotated integrally with one of the screw shafts.

15. The seat slide apparatus for the vehicle according to claim 9, wherein
   a contacting portion is formed at the bush,
   a second end portion of the coil spring contacts the contacting portion when the second end portion of the coil spring is rotated relative to the bush by a predetermined angle,
   and wherein after the bush is rotated integrally with one of the screw shafts by the predetermined angle, the bush together with the coil spring are rotated integrally with one of the screw shafts.

16. The seat slide apparatus for the vehicle according to claim 10, wherein
   a contacting portion is formed at the bush,
   a second end portion of the coil spring contacts the contacting portion when the second end portion of the coil spring is rotated relative to the bush by a predetermined angle,
   and wherein after the bush is rotated integrally with one of the screw shafts by the predetermined angle, the bush together with the coil spring are rotated integrally with one of the screw shafts.

17. The seat slide apparatus for the vehicle according to claim 11, wherein
   a contacting portion is formed at the bush,
   a second end portion of the coil spring contacts the contacting portion when the second end portion of the coil spring is rotated relative to the bush by a predetermined angle,
   and wherein after the bush is rotated integrally with one of the screw shafts by the predetermined angle, the bush together with the coil spring are rotated integrally with one of the screw shafts.

18. The seat slide apparatus for the vehicle according to claim 12, wherein
   a contacting portion is formed at the bush,
   a second end portion of the coil spring contacts the contacting portion when the second end portion of the coil spring is rotated relative to the bush by a predetermined angle,
   and wherein after the bush is rotated integrally with the transmitting shaft by the predetermined angle, the bush together with the coil spring is rotated integrally with the transmitting shaft.

19. The seat slide apparatus for the vehicle according to claim 13, wherein
   a contacting portion is formed at the bush,
   a second end portion of the coil spring contacts the contacting portion when the second end portion of the coil spring is rotated relative to the bush by a predetermined angle,
   and wherein after the bush is rotated integrally with the transmitting shaft by the predetermined angle, the bush together with the coil spring are rotated integrally with the transmitting shaft.

20. A seat slide apparatus for a vehicle comprising:
   a plurality of lower rails adapted to be fixed at a floor of the vehicle;
   a plurality of upper rails adapted to be slidably supported by the lower rails and to support a seat for the vehicle;
   a motor generating a driving force for moving the upper rails in a manner where the upper rails slide relative to the corresponding lower rails;
   a transmitting mechanism transmitting the driving force of the motor to the upper rails; and
   a slide-resistance applying portion provided in the transmitting mechanism and applying an increased slide resistance to the transmitting mechanism when the upper rails move in a first direction and applying a decreased slide resistance to the transmitting mechanism when the upper rails move in a second direction.

* * * * *